United States Patent [19]

Rich et al.

[11] 3,711,717
[45] Jan. 16, 1973

[54] OPTICAL LINE FOLLOWER

[75] Inventors: Leonard G. Rich, West Hartford; Dale G. Blake, Vernon, both of Conn.

[73] Assignee: The Gerber Scientific Instrument Company, South Windsor, Conn.

[22] Filed: Sept. 16, 1970

[21] Appl. No.: 72,575

[52] U.S. Cl. ................................................. 250/202
[51] Int. Cl. .................................................. G05b 1/00
[58] Field of Search .......... 250/202, 203; 340/172.5; 235/198; 318/162; 178/6.8

[56] References Cited

UNITED STATES PATENTS

| | | | |
|---|---|---|---|
| 3,529,084 | 9/1970 | Rich | 178/6.8 |
| 3,015,730 | 1/1962 | Johnson | 250/202 |
| 3,159,743 | 12/1964 | Brouilette | 250/202 |
| 3,473,157 | 10/1969 | Little | 250/202 |
| 2,851,643 | 9/1958 | Limberger | 250/202 |
| 2,933,668 | 4/1960 | Brouwer | 250/202 |
| 3,245,036 | 4/1966 | Grottrup | 250/202 |

Primary Examiner—James W. Lawrence
Assistant Examiner—D. C. Nelms
Attorney—McCormick, Paulding & Huber

[57] ABSTRACT

In an optical line follower having a circular scan path and encoders for encoding the position of the center of the scan path, a vector signal defining the location, relative to the center of the scan path, of the point at which the scan path crosses the followed line is added to the encoder signal to provide a coordinate data output signal which output signal repetitively taken at spaced points along the line describes the line more accurately than the encoder signal repetitively taken by itself.

6 Claims, 11 Drawing Figures

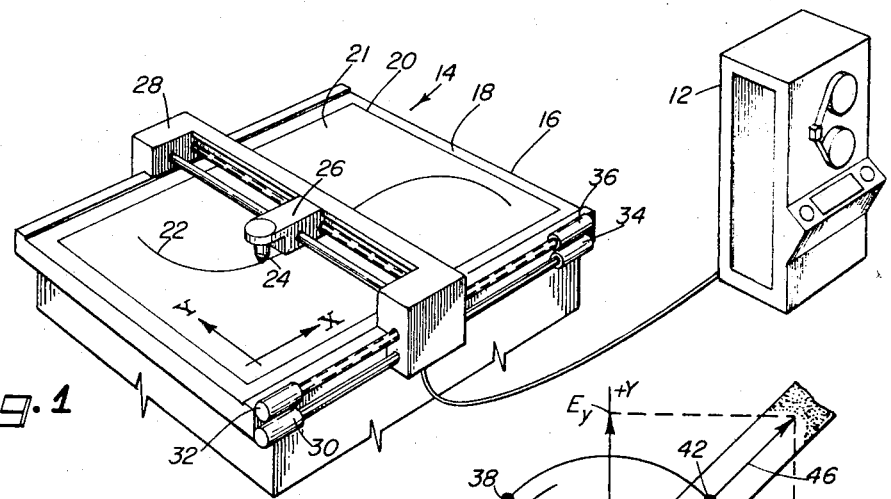
Fig. 1
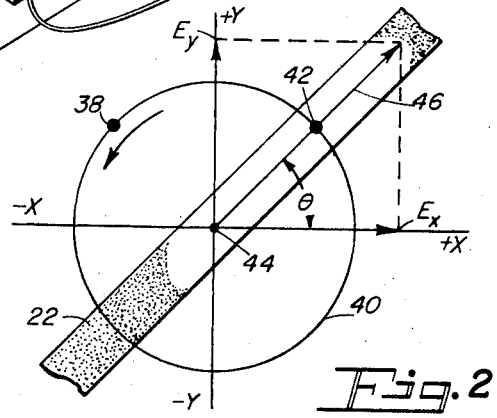
Fig. 2
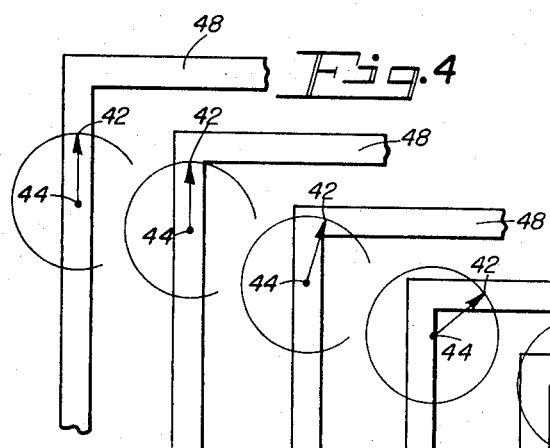
Fig. 4
Fig. 5
Fig. 6
Fig. 7
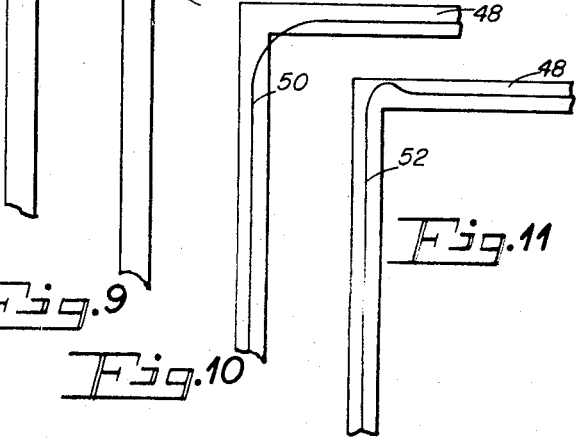
Fig. 8
Fig. 9
Fig. 10
Fig. 11

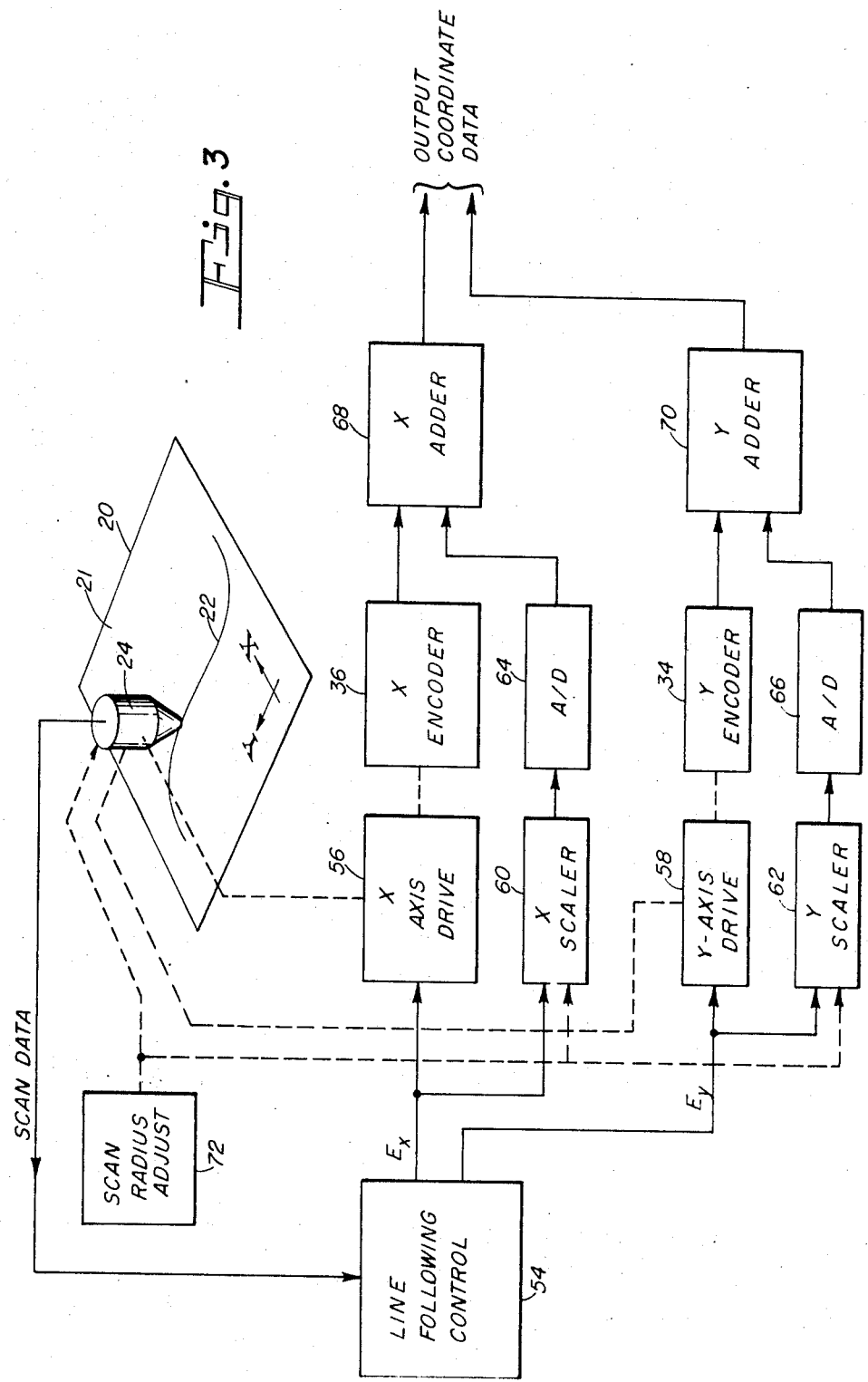

OPTICAL LINE FOLLOWER

BACKGROUND OF THE INVENTION

This invention relates to optical line followers, and deals more particularly with an improvement in such a line follower which uses a circular scan path.

The type of line follower with which this invention is concerned is one having a scanning device for scanning along a circular path on a work surface containing a line or edge to be followed. That is, the scanning device views or senses a condition such as reflectivity, of the work surface at a small sensing point which sensing point is moved in a circular path. A scan data signal is thereby produced indicating the condition of the work surface at the instantaneous location of the sensing point. The scan circle is relatively large compared to the width of the line to be followed and, therefore, each time the sensing point, in traversing the scan circle, crosses the line a change in signal is produced indicating the fact of crossing. A control system responsive to the scan data signal determines the angular position along the scan path at which the line crossing occurs and produces drive signals, used by a drive means for the scanning device, for driving the scanning device to cause the center of its scan circle to move toward the crossing point and to therefore follow along the line. A line follower of this general type is shown and described in detail in the patent application of Leonard G. Rich, Ser. No. 631,249, filed Apr. 17, 1967 for "Line Follower", now U.S. Pat. No. 3,529,084 and reference may be had to said patent for a more complete understanding of the construction and operation of such a device. In the drawings and description of this application the illustrated and described line follower, except for the improvement of this invention, may be taken to be identical to the line follower of said patent. It should be understood, however, that in its broader aspects this invention is not necessarily limited to any specific construction of line follower but may be applied to any line follower using a circular scan method broadly similar to that of said patent.

In the line follower of the aforesaid patent, encoders connected with the scanning device supply a composite output signal, consisting of X and Y coordinate components, indicating the position of the scan circle center relative to the work surface. These encoders are repeatedly interrogated as the scanning device moves along the line to provide coordinate output data representing spaced points along the line and numerically defining the line for analysis, reproduction or other purposes. For example, such coorcinate data may be recorded and later used in conjunction with a machine tool or plotter to drive a tool or pen along a synthesized reproduction of the line. In following sharp cornered or irregular lines, however, the center of the scan circle may not accurately follow the line with the result that the encoder output signals likewise do not accurately reflect the location of the points on the line. To correct this and to provide coordinate output data more accurately describing the followed line, this invention involves producing an output signal which represents the location of the point at which the scanning path crosses the line being followed, as this point is more perfectly slaved to the line than is the center of the scan circle. This is accomplished by adding to the encoder output signal a vector signal defining the location of the crossing point relative to the center of the scan path.

SUMMARY OF THE INVENTION

The invention resides in an optical line follower having a scanning device adapted to scan a work surface along a circular scan path and means responsive to the scanning information for producing a signal defining the angular position along the scan path of the point at which the path crosses the followed line. A controller responsive to the latter signals moves the scanning device to cause the center of the scan circle to move toward the crossing point, thereby slaving the scanning device to movement along the line. Encoders connected with the scanning device produce a signal defining the location of the center of the scan path relative to the work surface and to this encoder signal is added a vector signal defining the location of the crossing point relative to the center of the scan path, thereby producing an output signal defining the location of the crossing point relative to the work surface.

BRIEF DESCRIPTION OF THE DRAWINGS

FIG. 1 is a perspective view of a line follower embodying this invention.

FIG. 2 is a diagram showing the scan path of the line follower of FIG. 1 relative to the line being followed on the work surface.

FIG. 3 is a schematic block diagram showing the major components of the line follower of FIG. 1.

FIGS. 4 to 9 are illustrations each showing a sharp cornered line to be followed, the figure showing in sequence the scanning circle at various different points on such line as it moves around the corner.

FIG. 10 is an illustration showing the path followed by the center of the scan circle as it moves along the line of FIGS. 4 to 9.

FIG. 11 is an illustration showing the path followed by the crossing point of the scan circle as it moves along the line of FIGS. 4 to 9.

DETAILED DESCRIPTION OF THE PREFERRED EMBODIMENT

Referring to FIG. 1, this figure shows somewhat schematically the basic parts of a line follower embodying this invention. This line follower includes a control console 12 and an associated mechanism 14. The mechanism 14 in turn includes a table 16 having an upwardly facing flat surface 18 for supporting a sheet of paper 20 or other workpiece having a work surface 21 containing a line 22 thereon to be followed and digitized. A scanning device 24 is included in the mechanism 14 and is supported on a sub-carriage 26 for movement in the illustrated Y coordinate direction. The sub-carriage 26 is carried by a main carriage 28 which straddles the supporting surface 18 and is movable relative thereto in the illustrated X coordinate direction.

Suitable motors drive the main carriage 28 in the X coordinate direction and the sub-carriage 26 in the Y coordinate direction. These two motors are illustrated as stepping motors 30 and 32 and are, during operation of the mechanism, controlled by means in the console 12 in response to scan data produced by the scanning device 24 to cause the scanning device to be moved along the line 22. The mechanism 14 also includes two encoders, indicated at 34 and 36, which are connected with the Y and X drive mechanisms, respectively, and which supply signals or coded representations indicative of the instantaneous location of the sensing device 24 relative to the work surface 21. More accurately, and as explained in greater detail in the aforementioned application Ser. No. 631,249, now U.S. Pat. No. 3,529,084 the scanning 24 has a circular scan path and the encoders 34 and 36 together produce a composite signal, made up of X and Y coordinate signals, representing the location of the center of such a scan path.

FIG. 2 in magnified form shows a segment of the line 22 being followed and having the circular scan path of the scanning device 24 superimposed thereon. Turning to this figure, the point 38 represents the sensing point of the scanning device. This sensing point, by the operation of the sensing device, is moved at a relatively rapid rate along the illustrated circular scan path 40 in the direction of the arrow, and the sensing device operates to output a scan data signal representative of the optical condition of the work surface 21 at the instantaneous location of the sensing point. Normally, the condition to which the scanning device is sensitive is the reflectivity of the work surface 21 as determined by the amount of light reflected therefrom. By way of example, the illustrated surface 21 may be taken to have a high light reflectivity and the line 22 drawn thereon to have a low light reflectivity. Therefore, each time the sensing point 38 moves across the line 22 the scan data signal produced by the scanning device changes to indicate the fact of such line crossing. In FIG. 2, the point 42 represents the point along the circular scan path 40 at which the sensing point 38 crosses the line 22. Actually since the line 22 has some width the sensing point 38 moves along a small arc of the circle 40 in crossing the line and does not cross the line at a precise point. The crossing point 42, however, is taken to be that point which is located midway along the arc swept by the point 38 in crossing the line.

The scan data produced by the scanning device 24 is transmitted to the console 12 which includes a line following control similar to that described in the aforesaid patent which produces a signal defining the angular position of the crossing point 42 along the scan circle 40 and which signal is used to drive the scanning device to cause the center 44 of the scanning circle to move toward the crossing point 42. In one revolution or trip around the scan path the sensing point 38 crosses the line two times, but as explained in the aforesaid application only one of these line crossings is recognized and used by the control means. The signal defining the angular location of the crossing point 42 is a composite signal made up of X and Y components. More particularly, it consists of a first voltage $E_x$ analogously representing a distance along the X coordinate axis and a second voltage $E_y$ analogously representing a distance along the Y axis. These distances, as shown in FIG. 2, have a resultant 46 passing through the crossing point 42 and therefore define the angular position of the crossing point 42 along the circle 40.

The signals $E_x$ and $E_y$ are used to energize the drive motors 32 and 30, respectively, to cause the scanning device 24 to be simultaneously driven in the X direction at a speed directly related to the magnitude of the signal $E_x$ and to be driven in the Y direction at a speed directly related to the magnitude of the signal $E_y$. Accordingly the center of the scan circle 40 is driven toward the crossing point 42 or along the resultant line 46 of FIG. 2.

FIGS. 4 to 9 taken in sequence, show the manner in which the center 44 and the crossing point 42 of the circular scan path move as the sensing device moves around the sharp corner of the illustrated line 48. In considering these figures it should be remembered that the operation of the line follower is such that the center 44 is always moved toward the crossing point 42 and the crossing point 42 is always located midway along the arc traversed by the sensing point in moving across the line 48. From FIGS. 4 to 9, it will be evident that the center 44 of the scan circle in the vicinity of the corner of the line 48 does not accurately follow along the center of the line but instead tends to round the corner and to deviate substantially from the center of the line. This is illustrated by FIG. 10 which shows at 50 the path followed by the scan path center 44 as it moves past the corner of the line 48. On the other hand the crossing point 42 of the scan circle in moving past the corner of the line 48 much more accurately follows the center of the line 48. This is illustrated in FIG. 11 wherein the line 52 represents the path of the crossing point. From FIGS. 10 and 11 it will therefore be apparent that the line 48 is more accurately described by the path 52 of the crossing point than by the path 50 of the scan path center.

In accordance with the invention, therefore, the line follower of FIG. 1 includes means for causing the coordinate output data produced thereby to be data representing the path of the crossing point 42 rather than of the scan path center 44. Referring to FIG. 3, this figure shows in block diagram form the means by which this is achieved. The scan data from the scanning device 24 is transmitted to a line following control 54 which in response to the scan data produces an output signal, referred to herein as a direction signal, defining the angular position along the scan path of the point at which said scan path crosses the line being followed. As previously explained, this signal is a composite signal consisting of two coordinate components identified as $E_x$ and $E_y$. Each of these signals is a voltage signal analogously defining a distance along its associated coordinate axis. The coordinate signal $E_x$ is transmitted to an X axis drive system 56 including the motor 32 of FIG. 1, and the Y coordinate signal $E_y$ is transmitted to a Y axis drive system 58, including the motor 30 of FIG. 1. The X axis drive system 56 drives the scanning device 24 in the X coordinate direction at a speed related to the magnitude of the signal $E_x$ and likewise the Y axis drive system 58 simultaneously drives the scanning device 24 in the Y coordinate direction at a speed related to the magnitude of the signal $E_y$, the resultant of these two motions of the scanning device is therefore movement of the scanning device in such a manner as to move the center 44 of the scan path toward the crossing point 42.

The X axis drive system 56 is drivingly connected with the X encoder 36 which transmits to an X adder 68 a digital signal representing the X coordinate position of the center 44 of the scan path. Likewise, the Y axis drive system 58 is drivingly connected with the Y encoder 34 which supplys to a Y adder 70 a digital signal representing the Y coordinate position of the center of the scan path. The signal $E_x$ is also supplied to an X scaler 60, which may, for example, be a potentiometer or other multiplying circuit which produces an output signal directly related to the signal $E_x$ by a predetermined proportionality factor $k$. This proportionality factor is so selected that the resultant output signal $kE_x$ from the scaler is a vector signal representing by its magnitude the length in the X coordinate direction of the vector drawn from the center 44 of the scan path to the crossing point 42. The output signal from the X scaler 60 is an analog signal and is converted to a digital signal by an analog to digital converter 64. It is then transmitted to the X adder 68 which adds it to the output from the X encoder 36 to produce an X coordinate output data signal which, it will be understood, is representative of the X coordinate position of the crossing point 42 relative to the work surface.

Similar to the case for the X axis, the Y axis component $E_y$ of the direction signal is supplied to a Y scaler 62 which multiplies such signal by the same predetermined proportionality factor $k$ as used by the X scaler 60 to provide an analog output signal $kE_y$ representing by its magnitude the length of the Y component of the vector drawn from the center 44 of the scan path to the crossing point 42. This latter signal is converted by an analog to digital converter 66 to a digital signal transmitted to the Y adder 70 which adds it to the output of the Y encoder 34 to produce a Y coordinate output data signal representing the Y coordinate of the location of the crossing point 42 relative to the work surface.

Accordingly, the two output signals from the X adder and Y adder taken together define the location of the crossing point relative to the work surface. These signals are transmitted to the associated recording device or other utilization means and used to describe the line 22 being followed.

The predetermined proportionality factor $k$ is chosen so that the output signals from the X scaler 60 and the Y scaler 62 will represent the X and Y components of the vector drawn from the center 44 of the scan path to the line crossing point 42. Of course, the value of this proportionality factor will depend on the radius or diameter of the scan path. If the diameter of the scan path is fixed then the proportionality factor used by the two scalers may likewise be fixed. It is, however, preferable to include in the line follower a means for adjusting the diameter of the scan path, and such means are shown by way of example at 72 in FIG. 3. In an actual construction this means may, for example, include a zoom lens in the optical system of the scanning device. The scan radius adjusting means 72 in addition to being connected to or part of the scanning device 24 for varying the diameter of the scan path is also connected in common to the two scalers 60 and 62, as indicated in FIG. 3, so as to vary the proportionality factor $k$ in accordance with changes in the diameter of the scan circle to maintain the outputs from the two scalers quantities representing the location of the crossing point 42 relative to the center 44 of the scan path despite changes in the diameter of the scan path.

We claim:

1. An optical line follower of the type having a scanning device movable relative to a work surface containing a line to be followed and including means for optically scanning said work surface by determining the condition of said work surface at a sensing point which is repetitively moved across said line in a path spaced from a given center point, means responsive to the output of said scanning device for producing a direction signal related to the direction of the line between said center point and the point at which said path crosses said line to be followed, means responsive to said direction signal for moving said scanning device relative to said work surface to cause said center point to move toward said crossing point, and encoder means connected with said scanning device for producing an encoder signal defining the position of said center point relative to said work surface, wherein the improvement comprises a means for adding to said encoder signal a vector signal directly related to said direction signal to produce an output signal indicative of the position relative to said work surface of said crossing point.

2. An optical line follower as defined in claim 1 further characterized by said means for adding to said encoder signal a signal directly related to said direction signal including a scaling means for multiplying said direction signal by a predetermined factor to produce said vector signal.

3. An optical line follower of the type having a scanning device movable relative to a work surface containing a line to be followed and including means for optically scanning a circular scan path on said work surface, means responsive to the output of said scanning device for producing a direction signal related to the angular position along said scan path of the point at which such scan path crosses said line to be followed, means responsive to said direction signal for moving said scanning device relative to said work surface to cause the center of said circular scan path to move toward said crossing point, and encoder means connected with said scanning device for producing an encoder signal indicative of the position of the center of said scan path relative to said work surface, wherein the improvement comprises a means for adding to said encoder signal a vector signal directly related to said direction signal to produce an output signal indicative of the position relative to said work surface of said crossing point.

4. An optical line follower as defined in claim 3 further characterized by means for varying the diameter of said circular scan path, and said means for adding to said encoder signal a signal directly related to said direction signal including a scaling means for multiplying said direction signal by a predetermined factor to produce said vector signal, and means connected with said scan path diameter varying means for varying said predetermined factor with variations in said scan path diameter.

5. An optical line follower as defined in claim 3 further characterized by said means responsive to the output of said scanning device for producing a direction signal comprising a means for producing a direction signal having X and Y components defining the direction from the center of said scan path of said point at which said scan path crosses said line, said encoder means comprising means for producing a signal having X and Y components defining the position of the center of said circular scan path relative to said work surface, said means for adding to said encoder signal a vector signal directly related to said direction signal including means for multiplying each of said X and Y components of said direction signal by a common predetermined factor to produce X and Y components of said vector signal, means for adding said X component of said vector signal to said X component of said encoder signal, and means for adding said Y component of said vector signal to said Y component of said encoder signal.

6. An optical line follower as defined in claim 5 further characterized by said encoder means being adapted to provide said X and Y components of said encoder signal in digital form, said means for producing a direction signal being adapted to provide said X and Y components of said direction signal in analog form, said means for multiplying each of said X and Y components of said direction signal by a common predetermined factor being adapted to produce said X and Y components of said vector signal in analog form, an analog to digital converter for converting said X component of said vector signal to digital form prior to addition to said X component of said encoder signal, and an analog to digital converter for converting said Y component of said vector signal to digital form prior to addition to said Y component of said encoder signal.

* * * * *